US012754839B2

(12) United States Patent
Hou

(10) Patent No.: US 12,754,839 B2
(45) Date of Patent: Oct. 6, 2026

(54) COMPUTER DEVICE, DATA PROCESSING METHOD, AND COMPUTER SYSTEM FOR PERFORMING PERSISTENT STORAGE ON DATA

(71) Applicant: xFusion Digital Technologies Co., Ltd, Zhengzhou (CN)

(72) Inventor: Baochen Hou, Zhengzhou (CN)

(73) Assignee: XFUSION DIGITAL TECHNOLOGIES CO., LTD, Zhengzhou (CN)

( * ) Notice: Subject to any disclaimer, the term of this patent is extended or adjusted under 35 U.S.C. 154(b) by 134 days.

(21) Appl. No.: 18/615,003

(22) Filed: Mar. 25, 2024

(65) Prior Publication Data

US 2024/0232075 A1 Jul. 11, 2024

Related U.S. Application Data

(63) Continuation of application No. PCT/CN2022/121181, filed on Sep. 26, 2022.

(30) Foreign Application Priority Data

Sep. 26, 2021 (CN) .......................... 202111130176.5

(51) Int. Cl.
*G06F 12/02* (2006.01)

(52) U.S. Cl.
CPC ................................ *G06F 12/0292* (2013.01)

(58) Field of Classification Search
CPC ............. G06F 12/0292; G06F 12/0238; G06F 12/0284; G06F 12/7208; G06F 12/06;
(Continued)

(56) References Cited

U.S. PATENT DOCUMENTS 10,146,646 B1 * 12/2018 Foley .................. G06F 11/1662
11,288,122 B1 * 3/2022 Fleisher .................. G06F 1/187
(Continued)

FOREIGN PATENT DOCUMENTS

CN 101281453 A 10/2008
CN 105138481 A 12/2015
(Continued)

OTHER PUBLICATIONS

First Office Action for the corresponding CN application No. 202111130176.5, issued on Jul. 17, 2025, 29 pages.
(Continued)

*Primary Examiner* — Khoa D Doan

(57) ABSTRACT

The technology of this application relates to a computer device, a data processing method, and a computer system. The computer device includes a processor, at least one management chip, and at least two persistent memories, where the at least two persistent memories are connected to the processor by the at least one management chip, and the persistent memory is configured to perform persistent storage on data. The at least one management chip is configured to control a communication state between each persistent memory and the processor, and the processor is configured to access any one of the at least two persistent memories in communication with the processor.

20 Claims, 10 Drawing Sheets

(58) Field of Classification Search
CPC ...... G06F 3/0619; G06F 3/061; G06F 3/0658; G06F 3/0688; G06F 2212/7201; G06F 2212/7204; G06F 2212/7208; Y02D 10/00
See application file for complete search history.

(56) References Cited

U.S. PATENT DOCUMENTS

| | | | | |
|---|---|---|---|---|
| 11,461,032 | B1 * | 10/2022 | Tatsumi | G06F 3/0607 |
| 12,541,458 | B2 * | 2/2026 | Lee | G06F 12/0862 |
| 2002/0023195 | A1 * | 2/2002 | Okada | G06F 11/2089 711/151 |
| 2009/0100233 | A1 | 4/2009 | Worster | |
| 2010/0250848 | A1 | 9/2010 | Kim | |
| 2013/0024634 | A1 * | 1/2013 | Shitomi | G06F 16/185 711/E12.002 |
| 2014/0264904 | A1 | 9/2014 | Fai et al. | |
| 2017/0177528 | A1 | 6/2017 | Harriman | |
| 2018/0011651 | A1 * | 1/2018 | Sankaran | G06F 12/1009 |
| 2018/0349057 | A1 | 12/2018 | Osqueizadeh | |
| 2019/0235606 | A1 * | 8/2019 | Lee | G06F 1/3225 |
| 2020/0104253 | A1 * | 4/2020 | Perry | G06F 12/1425 |
| 2021/0011864 | A1 | 1/2021 | Guim Bernat | |
| 2021/0132827 | A1 * | 5/2021 | Helmick | G06F 3/0614 |
| 2021/0271622 | A1 | 9/2021 | Bueb | |
| 2021/0334226 | A1 * | 10/2021 | Yeung | G06F 13/382 |
| 2021/0382621 | A1 * | 12/2021 | Muthiah | G06F 12/10 |

FOREIGN PATENT DOCUMENTS

| | | | |
|---|---|---|---|
| CN | 108241585 | A | 7/2018 |
| CN | 108614668 | A | 10/2018 |
| CN | 110096452 | A | 8/2019 |
| CN | 110780942 | A | 2/2020 |
| CN | 111475099 | A | 7/2020 |

OTHER PUBLICATIONS

Extended European Search Report for corresponding EP application No. 22872173.4, issued on Dec. 11, 2024, 8 pages.
International Search Report w/English translation for PCT/CN2022/121181, mailed Nov. 29, 2022, 5 pages.

* cited by examiner

COMPUTER DEVICE, DATA PROCESSING METHOD, AND COMPUTER SYSTEM FOR PERFORMING PERSISTENT STORAGE ON DATA

CROSS-REFERENCE TO RELATED APPLICATIONS

This application is a continuation of International Application No. PCT/CN2022/121181, filed on Sep. 26, 2022, which claims priority to Chinese Patent Application No. 202111130176.5, filed on Sep. 26, 2021. The disclosures of the aforementioned applications are hereby incorporated by reference in their entireties.

TECHNICAL FIELD

This application relates to the field of computer technologies, and in particular, to a computer device, a data processing method, and a computer system.

BACKGROUND

With development of computer technologies, more data needs to be processed by a device. Persistent storage needs to be performed on some data in the data that needs to be processed. Persistent storage refers to a storage manner in which data is not lost due to power outage or restart of a device. How to perform persistent storage on data becomes a problem to be resolved.

SUMMARY

This application provides a computer device, a data processing method, and a computer system, to perform persistent storage on data. Technical solutions are as follows.

According to a first aspect, a computer device is provided. The device includes a processor, at least one management chip, and at least two persistent memories, where the at least two persistent memories are connected to the processor by the at least one management chip, and each of the at least two persistent memories is configured to perform persistent storage on data. The at least one management chip is configured to control a communication state between each persistent memory and the processor, and the processor is configured to access any one of the at least two persistent memories in communication with the processor.

The communication state between the persistent memory and the processor is controlled by the management chip, so that the processor is in communication with the at least two persistent memories. Because the processor can access the at least two persistent memories in communication with the processor, and the persistent memory can be configured to perform persistent storage on the data, a storage capacity used for persistent storage of the data is expanded, an insufficient storage capacity case is avoided. In addition, a new manner for persistent data storage is further provided, which is different from a manner of performing persistent storage on data by using only a disk in a related technology.

It should be noted that the persistent memory is also referred to as a non-volatile memory (NVM), is configured to perform persistent storage on the data, and is a storage medium (also referred to as a memory or storage hardware) that does not lose the data due to power outage or restart of the device. The processor can access the persistent memory according to an instruction, and an access process does not involve an input/output (IO) operation, that is, an IO operation does not need to be performed for accessing the persistent memory.

In a possible implementation, the computer device further includes a memory controller, the at least two persistent memories are connected to the memory controller, and the memory controller is connected to the processor by the at least one management chip. The processor is configured to access the memory controller based on a logical address, and the memory controller is configured to translate the logical address into a physical address, and to access, based on the physical address, any one of the at least two persistent memories in communication with the processor. The logical address is an address used on the side of the processor, and the physical address is an address used on the side of the persistent memory, that is, different addresses are used by the processor and the persistent memory. The memory controller needs to translate an address, so that the processor accesses the persistent memory.

In a possible implementation, the processor includes a logic controller, the logic controller is configured to store redundant array of independent disks (RAID) information, and the processor is configured to access, based on the RAID information stored in the logic controller, any one of the at least two persistent memories in communication with the processor. Because the at least two persistent memories are in communication with the processor in this application, a RAID mechanism can be implemented based on the at least two persistent memories in communication with the processor, thereby improving reliability of the computer device.

In a possible implementation, the processor includes a logic controller, and the logic controller is configured to partition the at least two persistent memories to obtain regions and namespaces. The processor is configured to access at least one of the region or the namespace included in any one of the at least two persistent memories in communication with the processor. The processor accesses the persistent memory in a unit of at least one of the region or the namespace. This access manner is flexible and further improves access efficiency.

In a possible implementation, the processor includes a logic controller, and the logic controller is configured to control the at least one management chip, to control the communication state between each persistent memory and the processor by the at least one management chip. The management chip is controlled by the logic controller, to control the communication state between each persistent memory and the processor. This control manner is flexible.

In a possible implementation, there are at least two management chips, the at least two management chips are separately connected to the processor, and any one of the at least two persistent memories is connected to the processor by any one of the at least two management chips. In this implementation, the persistent memory is horizontally disposed by the management chip, thereby expanding a storage capacity used for persistent storage of the data.

In a possible implementation, there are at least two management chips, a first management chip in the at least two management chips is connected to the processor, a second management chip in the at least two management chips is connected to the first management chip, any one of the at least two persistent memories is connected to the processor by the first management chip or the second management chip, the first management chip is at least one management chip in the at least two management chips, and the second management chip is another management chip other than the first management chip in the at least two management chips. In this implementation, the persistent memory is vertically disposed by the management chip, thereby expanding a storage capacity used for persistent storage of the data.

In a possible implementation, the computer device further includes a volatile memory, the volatile memory is connected to the processor, and the processor is further configured to access the volatile memory. Based on the persistent memory, the computer device can further perform non-persistent storage on the data by using the volatile memory.

According to a second aspect, a data processing method is provided. The method is applied to a computer device. The device includes a processor, at least one management chip, and at least two persistent memories, the at least two persistent memories are connected to the processor by the at least one management chip, a communication state between each of the at least two persistent memories and the processor is controlled by the at least one management chip, and each persistent memory is configured to perform persistent storage on data. The method includes:

the processor receives a data processing request; and the processor accesses, based on the data processing request, a target persistent memory that is in the at least two persistent memories and in communication with the processor, to read data from the target persistent memory or write data in the target persistent memory.

In a possible implementation, the device further includes a memory controller, the at least two persistent memories are connected to the memory controller, and the memory controller is connected to the processor by the at least one management chip. That the processor accesses, based on the data processing request, a target persistent memory that is in the at least two persistent memories and in communication with the processor includes: the processor accesses the memory controller based on the data processing request and a logical address. The memory controller translates the logical address into a physical address, and accesses the target persistent memory based on the physical address.

In a possible implementation, the processor includes a logic controller, and the logic controller stores RAID information. That the processor accesses, based on the data processing request, a target persistent memory that is in the at least two persistent memories and in communication with the processor includes: the processor accesses, based on the data processing request and the RAID information stored in the logic controller, the target persistent memory that is in the at least two persistent memories and in communication with the processor.

In a possible implementation, the processor includes a logic controller. The method further includes: the logic controller partitions the at least two persistent memories to obtain regions and namespaces. That the processor accesses, based on the data processing request, a target persistent memory that is in the at least two persistent memories and in communication with the processor includes: the processor accesses, based on the data processing request, at least one of the region or the namespace included in the target persistent memory that is in the at least two persistent memories and in communication with the processor.

In a possible implementation, the processor includes a logic controller. The method further includes: the logic controller controls the at least one management chip, to control the communication state between each persistent memory and the processor by the at least one management chip.

In a possible implementation, the device further includes a volatile memory, and the volatile memory is connected to the processor. The method further includes: the processor accesses the volatile memory based on the data processing request, to read data from the volatile memory or write data in the volatile memory.

According to a third aspect, a computer system is provided. The computer system includes at least two computer devices, where the computer device is the computer device provided in the first aspect or any possible implementation of the first aspect. A first computer device in the at least two computer devices is configured to send data to a second computer device, the second computer device is configured to store the data received in a persistent memory of the second computer device, the first computer device is any one of the at least two computer devices, and the second computer device is at least one computer device other than the first computer device in the at least two computer devices.

In a possible implementation, the data is data stored in a persistent memory of the first computer device.

DESCRIPTION OF EMBODIMENTS

The terms used in the implementation part of this application are merely used to explain specific embodiments of this application, and are not intended to limit this application.

As a quantity of data-oriented applications (APP) increases, a volume of data that a device needs to process increases. Persistent storage needs to be performed on some data in the device. Persistent storage refers to a storage manner in which data is not lost due to power outage or restart of a device.

In a related technology, persistent storage is performed on data by using a disk. Illustratively, the disk includes a solid state disk (SSD), a hard disk drive (HDD), a tape, or the like.

In this embodiment, a persistent memory is used to replace the disk in the related technology, and persistent storage is performed on data by using the persistent memory. Therefore, a new manner for persistent data storage is provided. In addition, at least two persistent memories are used to replace the disk. Therefore, a storage capacity used for persistent storage of the data can be expanded, thereby avoiding an insufficient storage capacity case.

Figure 1:
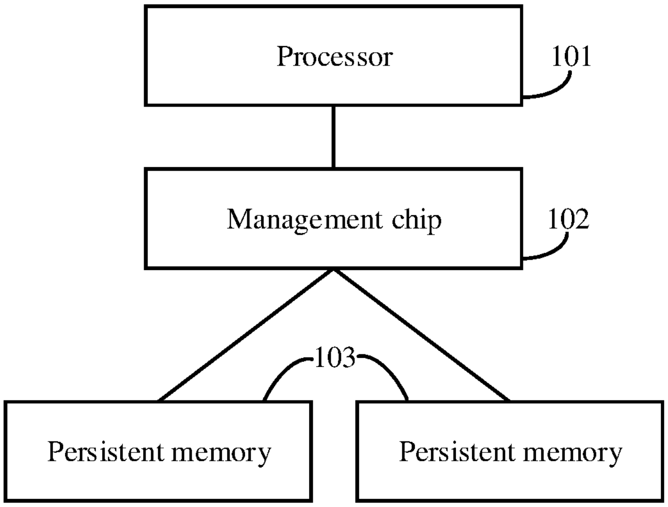
FIG. 1 is a schematic diagram of a structure of a computer device according to an example embodiment of this application.

An embodiment of this application provides a computer device. Referring to FIG. 1, the device includes a processor 101, at least one management chip 102, and at least two persistent memories 103. The at least two persistent memories 103 are connected to the processor 101 by the at least one management chip 102, and the persistent memories 103 are configured to perform persistent storage on data.

In the computer device, the at least one management chip 102 is configured to control a communication state between each persistent memory 103 and the processor 101. The processor 101 is configured to access any one of the at least two persistent memories 103 in communication with the processor 101, to read data from the persistent memory 103 or write data in the persistent memory 103. For a process of accessing the persistent memory 103 by the processor 101, refer to descriptions in the following method embodiment.

Illustratively, the management chip 102 controls the communication state between each persistent memory 103 and the processor 101 in the following control manner, to control a topological link relationship between the persistent memories 103 and the processor 101. It can be understood that the following control manner is merely an example. In this embodiment, the control manner used by the management chip 102 is not limited, and the management chip 102 can select an appropriate control manner based on an actual requirement.

The management chip 102 has a switch function, that is, the management chip 102 includes an enabled state and a disabled state. Because the at least two persistent memories 103 are connected to the processor 101 by the at least one management chip 102, the at least one management chip 102 is included between one persistent memory 103 and the processor 101. For a persistent memory 103, in response to that all management chips 102 between the persistent memory 103 and the processor 101 are in the enabled state, the persistent memory 103 is in communication with the processor 101 (that is, the persistent memory 103 is bound to the processor 101), and the processor 101 can access the persistent memory 103. Alternatively, in response to that any management chip 102 between the persistent memory 103 and the processor 101 is in the disabled state, the persistent memory 103 is not in communication with the processor 101 (that is, the persistent memory 103 is unbound from the processor 101), and the processor 101 cannot access the persistent memory 103. Illustratively, for a management chip 102, the management chip 102 can control whether any persistent memory 103 connected to the management chip 102 is in communication with the processor 101. For example, the processor 101 and the two persistent memories 103 are separately connected to the management chip 102. The management chip 102 can control one of the persistent memories 103 to be in communication with the processor 101, and control the other persistent memory 103 not to be in communication with the processor 101.

In an illustrative embodiment, the persistent memory 103 is a memory for which an input/output (IO) operation does not need to be performed. The IO operation is an operation that needs to be performed when a disk is accessed, and the IO operation is, for example, a track search operation or a sector search operation. Because the IO operation needs to be performed when the disk is accessed, efficiency of data processing performed by accessing the disk is low. However, because the IO operation does not need to be performed for accessing the persistent memory 103, efficiency of data processing performed by accessing the persistent memory 103 is high, and drive writes per day (DWPD) of the persistent memory 103 are further increased. Therefore, the persistent memory 103 has high reliability. When the device includes such a persistent memory 103 for which the IO operation does not need to be performed, if a service is interrupted because the device is shut down, data stored in the persistent memory 103 is not lost, and a recovery time object (RTO) is shortened because the efficiency of data processing performed by accessing the persistent memory 103 is high, thereby ensuring service stability.

In this embodiment, the disk is replaced with the persistent memory 103. Therefore, a new persistent storage manner is provided. In addition, because there are at least two persistent memories 103 in this embodiment of this application, a storage capacity used for persistent storage of the data can be expanded, thereby avoiding an insufficient storage capacity case. In addition, because the IO operation does not need to be performed for accessing the persistent memory 103, but the IO operation needs to be performed for accessing the disk, the IO operation can be not involved in a data processing process by using the persistent memory 103, thereby saving time for performing the IO operation, and improving data processing efficiency.

Figure 2:
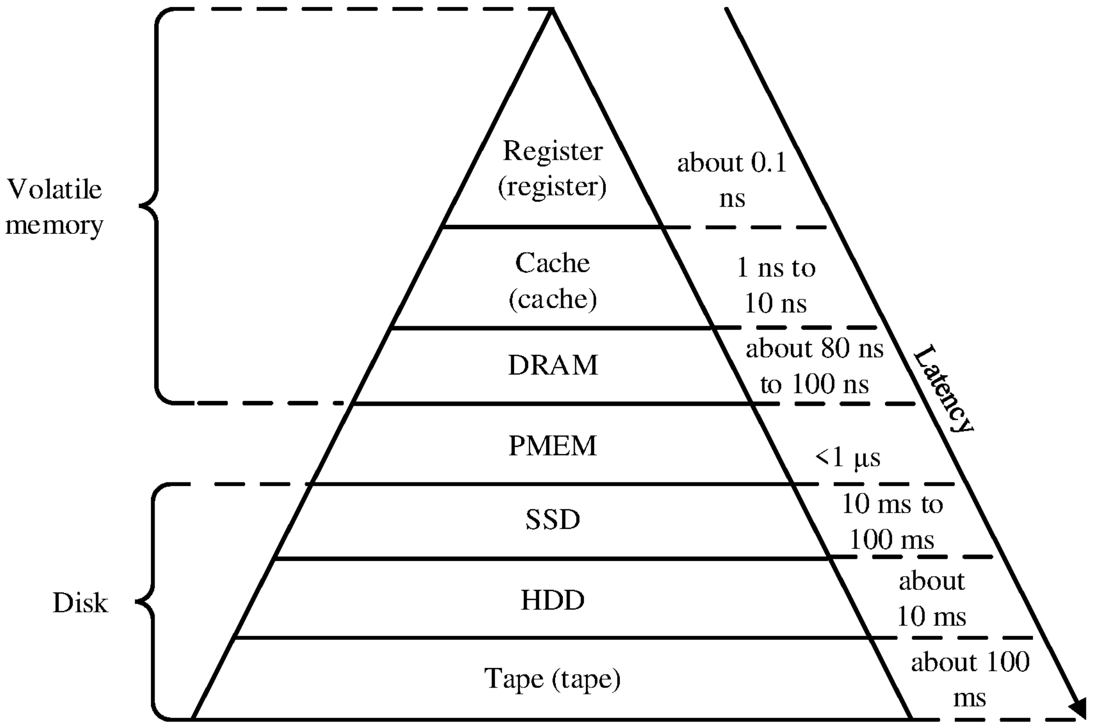
FIG. 2 is a schematic diagram of a storage medium according to an example embodiment of this application.

Illustratively, the persistent memory 103 includes but is not limited to a persistent memory (PMEM). Referring to FIG. 2, compared with the disk in the related technology (for example, an SSD, an HDD, or a tape shown in FIG. 2), the PMEM has a low latency and high data processing efficiency.

Figure 3:
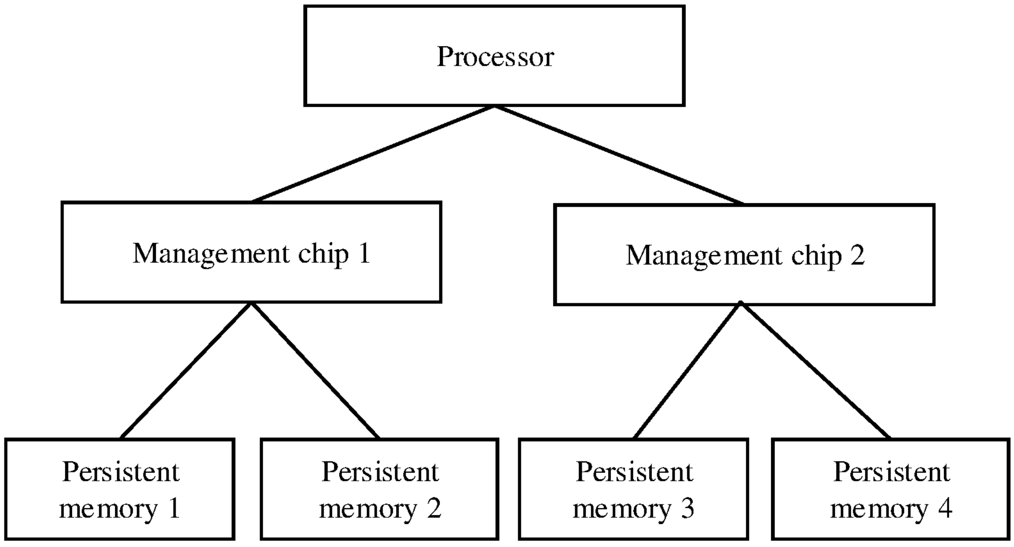
FIG. 3 is a schematic diagram of a structure of a computer device according to an example embodiment of this application.

In an illustrative embodiment, the at least two persistent memories 103 are horizontally disposed. There are at least two management chips 102, and the at least two management chips 102 are separately connected to the processor 101. Any one of the at least two persistent memories 103 is connected to the processor 101 by any one of the at least two management chips 102. For example, referring to FIG. 3, a management chip 1 and a management chip 2 are separately connected to the processor, a persistent memory 1 and a persistent memory 2 are connected to the management chip 1, and a persistent memory 3 and a persistent memory 4 are connected to the management chip 2.

Figure 4:
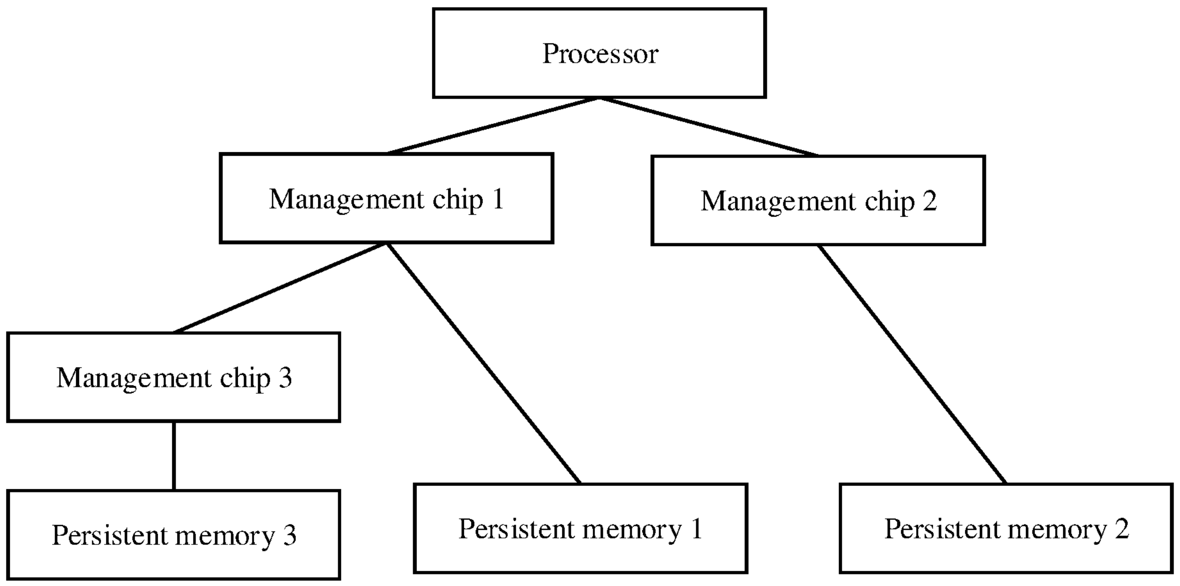
FIG. 4 is a schematic diagram of a structure of a computer device according to an example embodiment of this application.

In an illustrative embodiment, the at least two persistent memories 103 are vertically disposed. There are at least two management chips 102, a first management chip in the at least two management chips 102 is connected to the processor 101, a second management chip in the at least two management chips 102 is connected to the first management chip, and any one of the at least two persistent memories 103 is connected to the processor 101 by the first management chip or the second management chip. The first management chip is at least one management chip in the at least two management chips 102, and the second management chip is another management chip other than the first management chip in the at least two management chips 102. For example, the first management chip includes a management chip 1 and a management chip 2, and the second management chip includes a management chip 3. Referring to FIG. 4, the management chip 1 and the management chip 2 are separately connected to the processor, and the management chip 3 is connected to the management chip 1. A persistent memory 1 is connected to the management chip 1, a persistent memory 2 is connected to the management chip 2, and a persistent memory 3 is connected to the management chip 3. Illustratively, there are at least one first management chip and at least one second management chip. A quantity of first management chips and a quantity of second management chips are not limited in this embodiment.

The foregoing describes the processor 101, the management chip 102, and the persistent memory 103 that are included in the computer device. Illustratively, the computer device further includes other components, which are separately described below.

Figure 5:
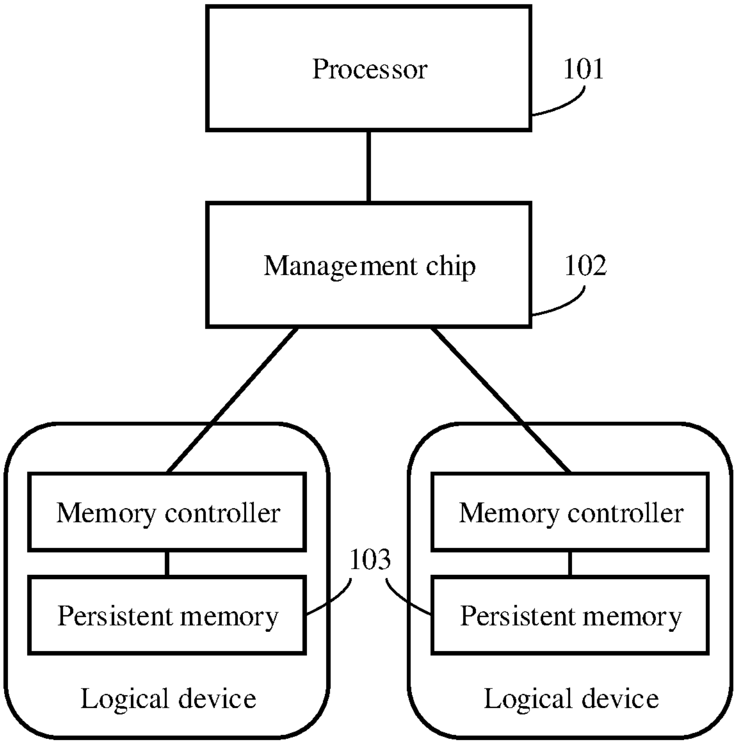
FIG. 5 is a schematic diagram of a structure of a computer device according to an example embodiment of this application.

In an illustrative embodiment, the computer device further includes a memory controller. The at least two persistent memories 103 are connected to the memory controller, and the memory controller is connected to the processor 101 by the at least one management chip 102. Illustratively, the memory controller is in a one-to-one correspondence with the persistent memory 103. Referring to FIG. 5, the memory controller and the persistent memory 103 constitute a logical device (LD). A function of the memory controller includes but is not limited to performing translation between a logical address and a physical address. The logical address is a host physical address (HPA) used on the side of the processor 101, and the physical address is a device physical address (DPA) used on the side of the persistent memory 103. In the following method embodiment, the function of the memory controller is described in detail. Illustratively, the processor 101 interacts with the memory controller by using a compute express link (CXL) technology, and therefore the logical device including the memory controller is also referred to as a CXL device. Illustratively, the CXL technology used in this embodiment is CXL 2.0, and the used CXL technology is not limited in this embodiment. By using the CXL technology, there is no need to add redundant memory management hardware for the persistent memory 103. Therefore, higher performance is achieved, software stack complexity is reduced, and costs are saved.

Figure 6:
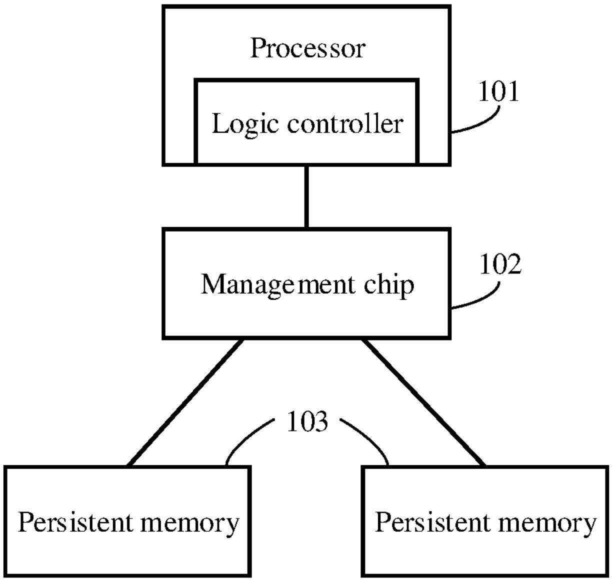
FIG. 6 is a schematic diagram of a structure of a computer device according to an example embodiment of this application.

Referring to FIG. 6, in an illustrative embodiment, the processor 101 includes a logic controller. The logic controller is configured to perform logical device management (LDM). Illustratively, functions of the logic controller include partitioning the persistent memory 103. In cases where the persistent memory 103 is partitioned, the LD in which the persistent memory 103 is located is a multi-logical device (LD). In cases where the persistent memory 103 is not partitioned, the LD in which the persistent memory 103 is located is a single-logical device (SLD). Certainly, partitioning the persistent memory 103 by the logic controller is merely an example. In this embodiment, the persistent memory 103 may alternatively be partitioned by a component, for example, a baseboard management controller (BMC) or a basic input/output system (BIOS). Illustratively, the functions of the logic controller further include storing RAID information, where the RAID information is used to implement a RAID mechanism between the at least two persistent memories 103. Illustratively, the functions of the logic controller further include controlling the management chip 102. It can be learned from the foregoing description that the management chip 102 can control the communication state between each persistent memory 103 and the processor 101. In cases where the processor 101 includes the logic controller, illustratively, the logic controller controls, by the management chip 102, the communication state between each persistent memory 103 and the processor 101. For example, the logic controller sends a control instruction to the management chip 102, and the management chip 102 controls the communication state between each persistent memory 103 and the processor 101 according to the control instruction. In some implementations, the functions of the logic controller further include detecting a health state of the persistent memory 103, and performing an alarm when the health state of the persistent memory 103 does not meet a requirement. For example, the health state of the persistent memory 103 is an occupancy rate of the persistent memory 103. In response to that the occupancy rate is higher than a threshold, it is considered that the health state of the persistent memory 103 does not meet the requirement. The threshold is not limited in this embodiment. It can be understood that the functions of the logic controller described above are merely examples, and the functions of the logic controller are not limited in this embodiment. In the following method embodiment, the functions of the logic controller are described in detail.

Figure 7:
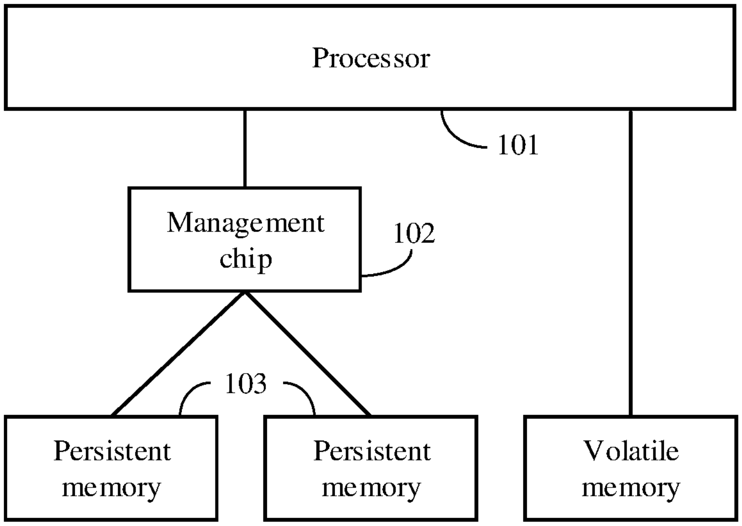
FIG. 7 is a schematic diagram of a structure of a computer device according to an example embodiment of this application.

Illustratively, referring to FIG. 7, the computer device further includes a volatile memory connected to the processor 101. Both the persistent memory and the disk in the foregoing description are configured to perform persistent storage on the data, which is a storage manner in which the data is not lost due to power outage or restart of the device. The volatile memory is configured to perform non-persistent storage on the data, which is a storage manner in which the data is lost due to power outage or restart of the device.

Illustratively, the volatile memory includes but is not limited to a dynamic random access memory (DRAM), a cache, or a register shown in FIG. 2. After power outage or restart of the computer device, the data stored in the volatile memory is lost. In this case, the processor 101 accesses the persistent memory 103 to read the data stored in the persistent memory 103, and stores the read data in the volatile memory. In a subsequent running process of the computer device, the processor 101 can access the volatile memory to perform data processing. It can be seen from FIG. 2 that a latency of the volatile memory is lower than a latency of the persistent memory 103. Therefore, a latency can be shortened and data processing efficiency can be improved in this manner.

Figure 8:
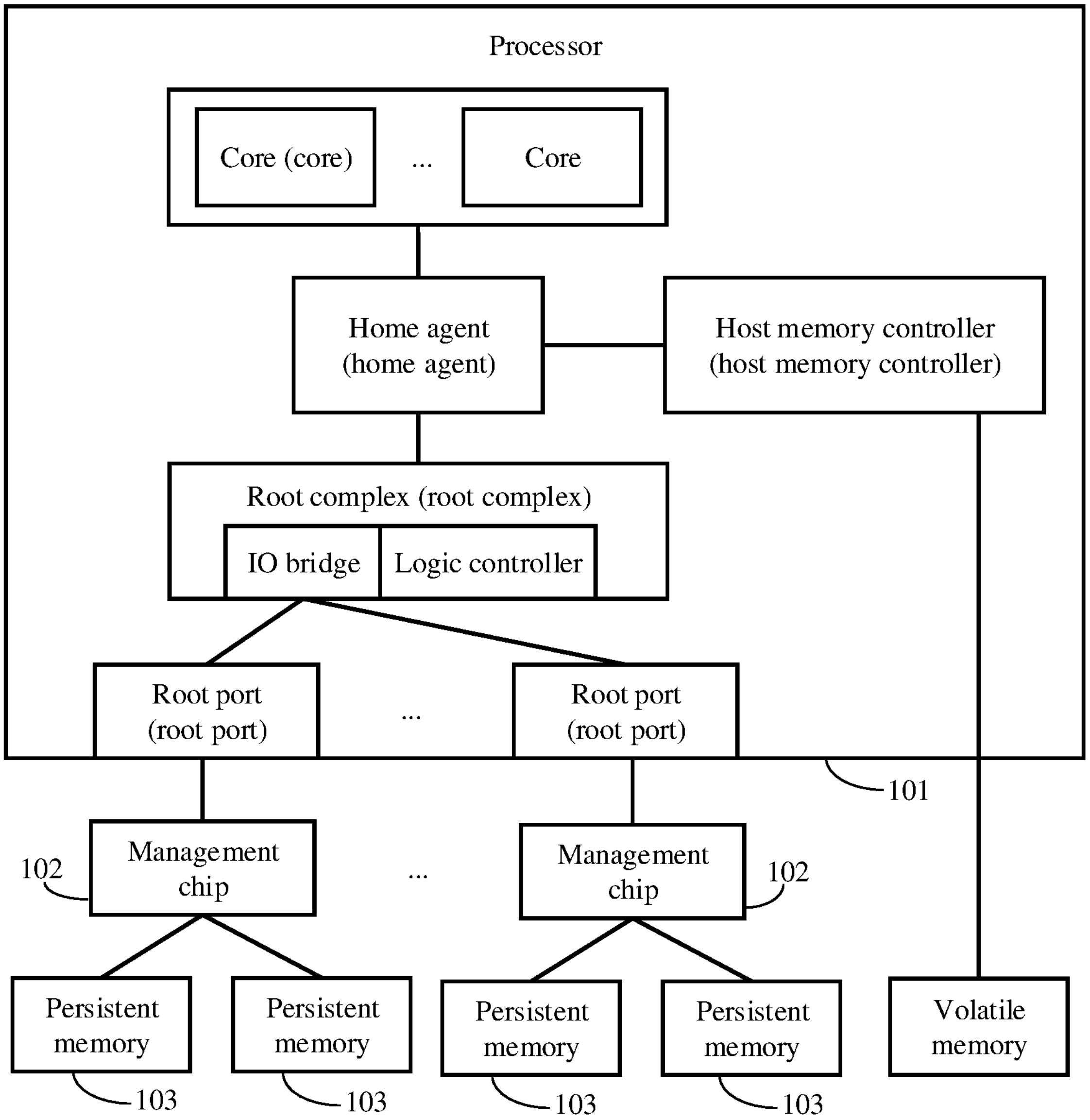
FIG. 8 is a schematic diagram of a structure of a computer device according to an example embodiment of this application.

Illustratively, FIG. 8 shows an illustrative structure of a computer device. The processor 101 includes a root complex, and the root complex includes an IO bridge and the logic controller in the foregoing description. The IO bridge is connected to a root port, and the root port is connected to the management chip 102 in the foregoing description. The processor 101 further includes a home agent, the home agent is connected to a core, the home agent is further connected to a host memory controller, and the host memory controller is connected to the volatile memory in the foregoing description.

Figure 9:
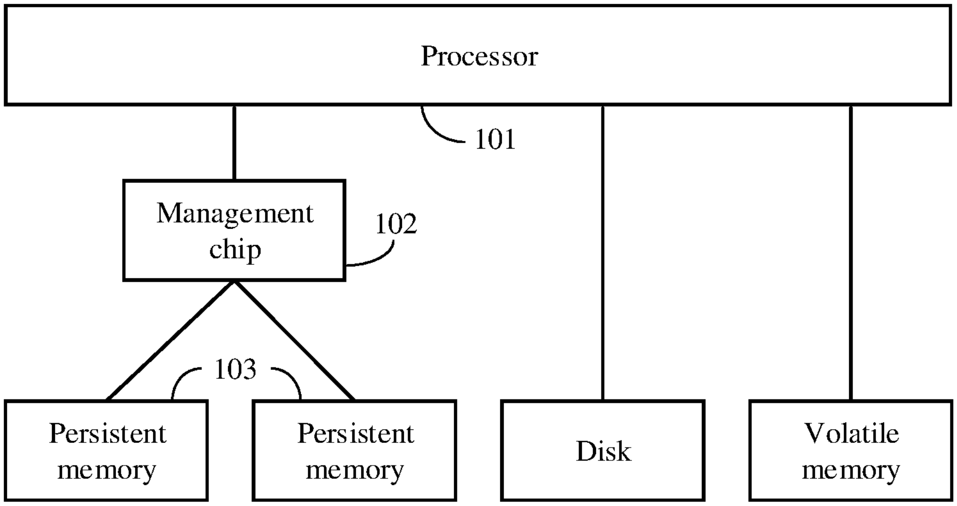
FIG. 9 is a schematic diagram of a structure of a computer device according to an example embodiment of this application.

Referring to FIG. 9, in some implementations, the computer device further includes a disk, and the disk and the at least two persistent memories 103 are jointly configured to perform persistent storage on the data. Because the IO operation needs to be performed in a process of accessing the disk, and the IO operation does not need to be performed in a process of accessing the persistent memory 103, data processing efficiency during disk access is low. Illustratively, in this implementation, it may be determined, based on a processing requirement, whether to perform persistent storage on the data by using the persistent memory or the disk. For example, persistent storage is performed on the data by using the persistent memory 103 in response to a requirement that a data processing latency is lower than a threshold. Persistent storage is performed on the data by using the disk in response to that the data processing latency is allowed to be higher than the threshold. The threshold is not limited in this embodiment. Alternatively, in this implementation, it may be determined, based on a data type, whether to perform persistent storage on the data by using the persistent memory or the disk. Illustratively, persistent storage is performed on the data by using the persistent memory 103 in response to that the data type is a target type. Persistent storage is performed on the data by using the disk in response to that the data type is not a target type. There may be a plurality of data types, and the target type is at least one of the plurality of types. For example, the plurality of types include an integer type (int), a float type (float), and a character type (char), and the target type is int. Persistent storage is performed on the data by using the persistent memory 103 in response to that the data type is int. Persistent storage is performed on the data by using the disk in response to that the data type is float or char.

Figure 10:
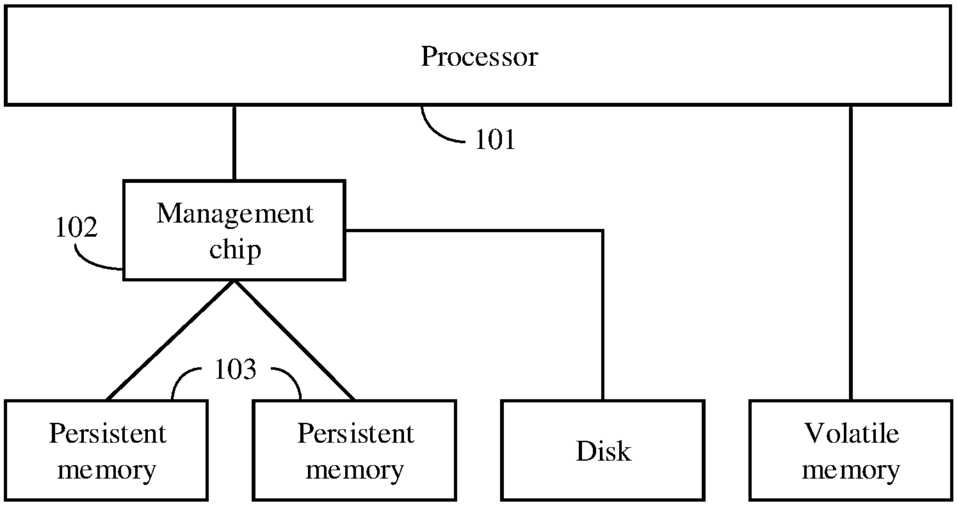
FIG. 10 is a schematic diagram of a structure of a computer device according to an example embodiment of this application.

In FIG. 9, the disk is connected to the processor 101. Referring to FIG. 10, the disk may alternatively be connected to the management chip 102. The management chip 102 is not only configured to control the communication state between the persistent memory 103 and the processor 101, but also configured to control a communication state between the disk and the processor 101. For the processor 101, the processor 101 may persistently store the data in the persistent memory 103 or the disk that is in communication with the processor 101. The process in which the management chip 102 controls the communication state refers to the foregoing description.

Figure 11:
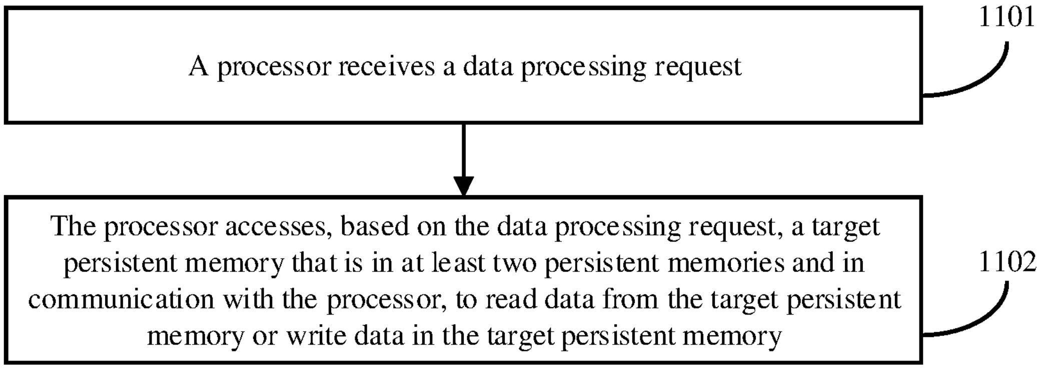
FIG. 11 is a flowchart of a data processing method according to an example embodiment of this application.

Based on the computer devices described in FIG. 1 to FIG. 10, an embodiment of this application provides a data processing method. The method is applied to a process of interaction between a processor and a persistent memory. Referring to FIG. 11, the method includes the following steps.

1101: the processor receives a data processing request.

Figure 12:
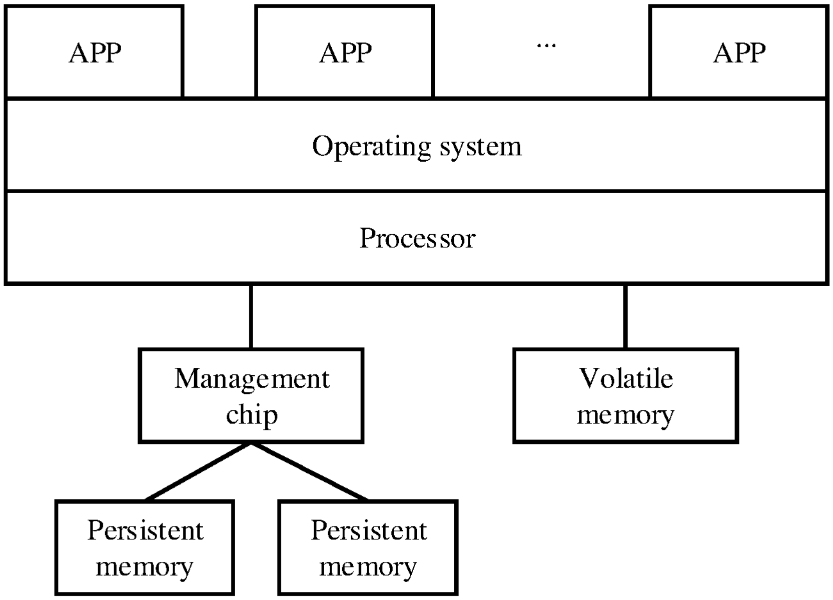
FIG. 12 is a schematic diagram of a structure of a computer device according to an example embodiment of this application.

Illustratively, referring to FIG. 12, the processor receives the data processing request from an operating system (OS), and the data processing request is determined by the OS based on a request of an APP. In some implementations, the data processing request includes a processing identifier and an address, the processing identifier is used to indicate a processing manner, and the processing manner includes reading and writing. The address is an address of data that needs to be processed.

1102: the processor accesses, based on the data processing request, a target persistent memory that is in at least two persistent memories and in communication with the processor, to read data from the target persistent memory or write data in the target persistent memory.

A manner in which the processor accesses a persistent memory includes: the processor sends a data processing instruction to the persistent memory. Illustratively, the processor determines, based on the address in the data processing request, whether the data that needs to be processed is persistent data. In response to determining that the data that needs to be processed is persistent data, the processor sends the data processing instruction to the target persistent memory. Illustratively, the processor stores an address range corresponding to each persistent memory, and in response to that the address in the data processing request is located in the address range corresponding to the persistent memory, it is determined that the data that needs to be processed is persistent data. Then, the processor performs encapsulation based on the processing identifier and the address to obtain the data processing instruction, and sends the data processing instruction to the target persistent memory.

Figure 13:
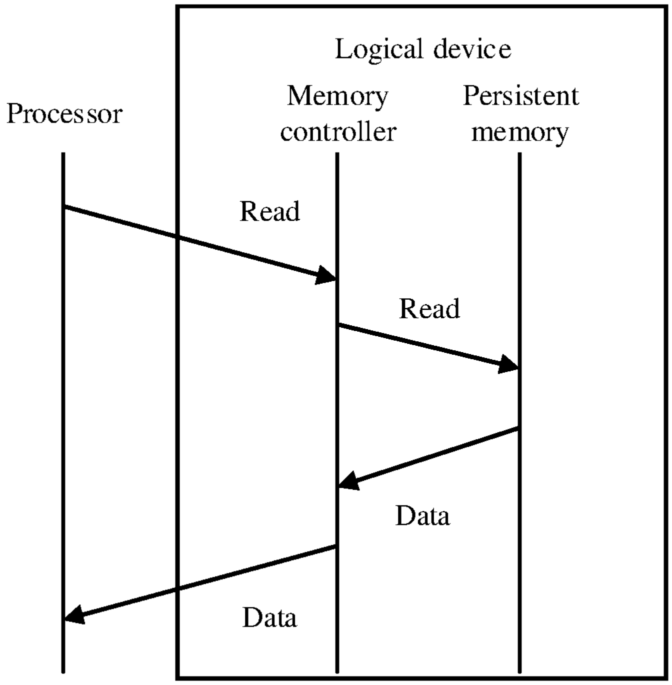
FIG. 13 is a schematic diagram of an address translation according to an example embodiment of this application.
Figure 14:
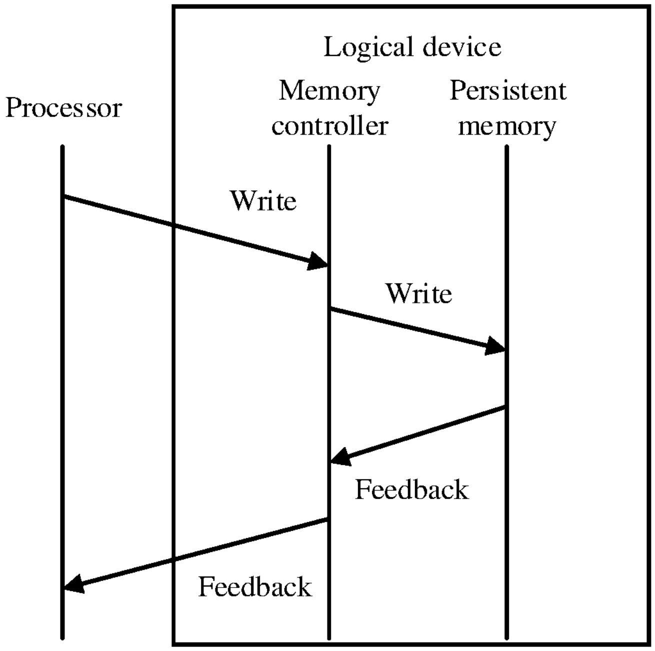
FIG. 14 is a schematic diagram of an address translation according to an example embodiment of this application.

In response to that the processing manner indicated by the processing identifier is reading, the data processing instruction is used by the processor to read the persistent data from the target persistent memory based on the address. The processor may return the read data to the OS, or perform processing such as calculation on the read data and return a processing result to the OS, to complete processing for the data processing request. Referring to FIG. 13, FIG. 13 shows a case in which the processing manner is reading. Alternatively, in response to that the processing manner indicated by the processing identifier is writing, the method further includes: sending the data to the target persistent memory, and the data processing instruction is used by the processor to write the data in the target persistent memory based on the address. FIG. 14 shows a case in which the processing manner is writing. Illustratively, after the data is written in the target persistent memory, the target persistent memory further returns feedback information, and the processor can determine that the target persistent memory has completed the writing. It should be noted that the writing includes two different cases. In a first case, data with a practical significance is written in the target persistent memory, so that the target persistent memory stores the written data. In a second case, data that has no practical significance is written in the target persistent memory, so that data that is already stored in the target persistent memory is erased.

In response to determining that the data that needs to be processed is non-persistent data, the processor no longer accesses the persistent memory, but accesses the volatile memory in the computer device. In an illustrative embodiment, the method further includes: the processor accesses the volatile memory based on the data processing request, to read data from the volatile memory or write data in the volatile memory. Illustratively, the processor stores an address range corresponding to the volatile memory, and in response to that the address of the data that needs to be processed is located in the address range corresponding to the volatile memory, it is determined that the data that needs to be processed is non-persistent data. Therefore, the data processing instruction is obtained through encapsulation based on the processing identifier and the address, and the data processing instruction is sent to the volatile memory.

In a case where the data that needs to be processed is persistent data, in some implementations, the address in the data processing instruction is a physical address of the persistent data (that is, a DPA used on the side of the persistent memory). In some other implementations, when the computer device includes the memory controller configured to perform address translation, the address in the data processing instruction is a logical address of the persistent data (that is, an HPA used on the side of the processor). That the processor accesses, based on the data processing request, a target persistent memory that is in at least two persistent memories and in communication with the processor includes: the processor accesses the memory controller based on the data processing request and a logical address. The memory controller translates the logical address into a physical address, and accesses the target persistent memory based on the physical address.

The processor stores a logical address range corresponding to each persistent memory. That the processor accesses the memory controller based on the logical address includes: the logical address of the persistent data is located in a logical address range corresponding to a certain persistent memory, the processor accesses a memory controller corresponding to the certain persistent memory, that is, sends the data processing instruction including the processing identifier and the logical address to the memory controller corresponding to the certain persistent memory. The memory controller parses the data processing instruction to obtain the processing identifier and the logical address, to translate the logical address into the physical address. Referring to FIG. 13 and FIG. 14, FIG. 13 shows a process in which the memory controller performs address translation when the processing manner indicated by the processing identifier is reading, and FIG. 14 shows a process in which the memory controller performs address translation when the processing manner indicated by the processing identifier is writing. After the memory controller translates the logical address into the physical address, the target persistent memory can be accessed based on the physical address. That the memory controller accesses the target persistent memory based on the physical address includes: the memory controller sends the data processing instruction including the processing identifier and the physical address to the target persistent memory.

Figure 15:
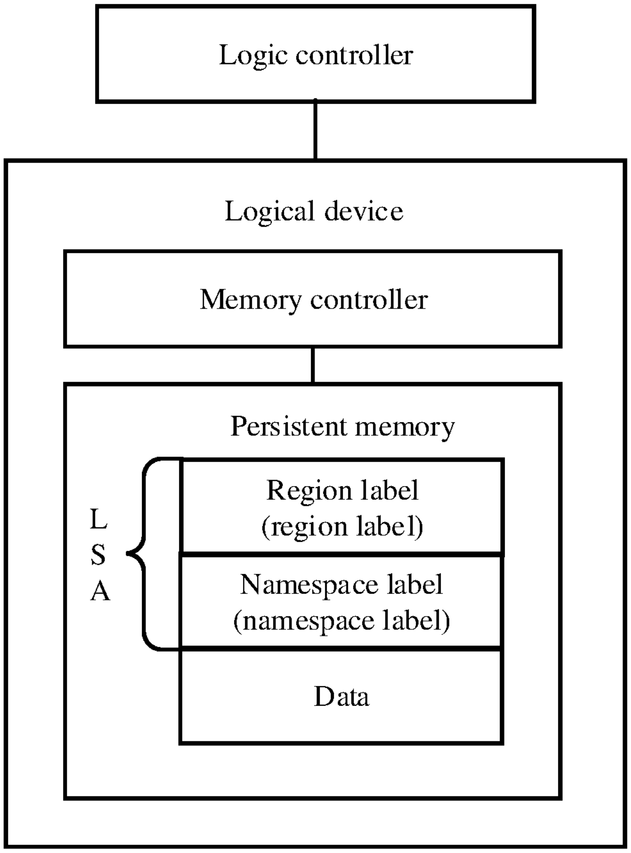
FIG. 15 is a schematic diagram of a structure of a computer device according to an example embodiment of this application.

In an illustrative embodiment, in a case where the processor includes the logic controller, the method further includes: the logic controller partitions the at least two persistent memories to obtain regions and namespaces. For ease of understanding, the following describes the region and the namespace first with reference to FIG. 15.

The persistent memory includes a label storage area (LSA) and data. Illustratively, a first byte range in the persistent memory is used to store the LSA, and a second byte range is used to perform persistent storage on the data. In some implementations, the first byte range includes bytes of a reference length starting from a start address of the persistent memory, and the second byte range includes other bytes after the first byte range. The reference length is not limited in this embodiment.

Figure 16:
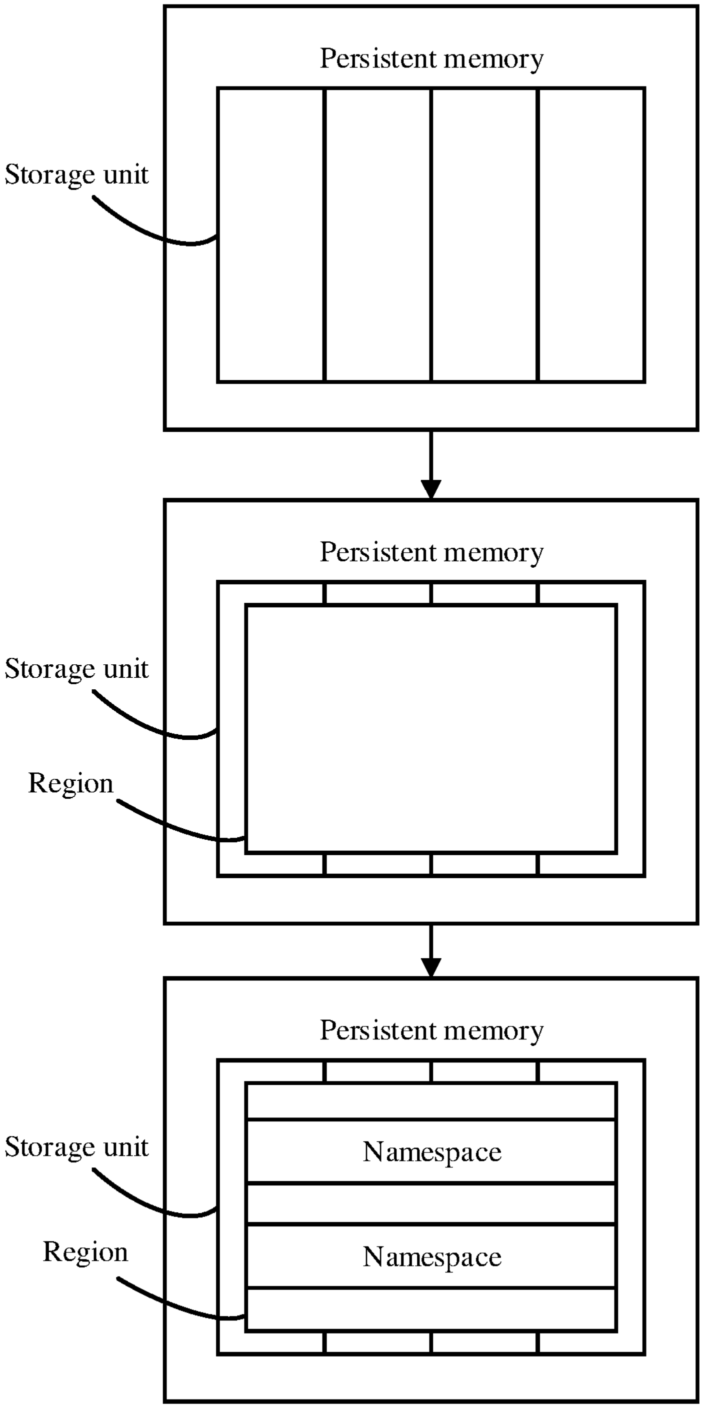
FIG. 16 is a schematic diagram of a region and a namespace according to an example embodiment of this application.

The persistent memory is composed of a plurality of storage units. The storage units are not limited in this embodiment. Referring to FIG. 16, the persistent memory includes at least one region. In response to that one region covers not less than two storage units, the region is of an interleaved type. In response to that one region covers only one storage unit, the region is of a non-interleaved type. Still referring to FIG. 16, one region includes at least one namespace. A quantity of namespaces included in the region is not limited in this embodiment.

The LSA includes a region label and a namespace label. The region label is used to indicate a region in the persistent memory, and the namespace is used to indicate a namespace in the persistent memory. Illustratively, the region label includes the following information a) to information e), and the namespace label includes the following information f) to information i):

a) a region universally unique identifier (UUID), used to uniquely identify each region included in the persistent memory, that is, the region is in a one-to-one correspondence with the region UUID;

b) interleaved information, used to indicate whether the region is of the interleaved type, and further indicate storage units covered by the region if the region is of the interleaved type;

c) an address correspondence, that is, a correspondence between the logical address and the physical address, where the address correspondence is used by the memory controller to perform translation between the logical address and the physical address;

d) region information, that is, a namespace identifier of the namespace included in the region, where the namespace identifier is used to uniquely identify the namespace;

e) an address range corresponding to the region, for example, a start address and a length of the region;

f) an identifier of the namespace;

g) byte alignment information, where for each piece of data in the namespace, a storage address of the data is adjusted based on a data length and an access granularity of the persistent memory, so that a start address of a piece of the data is an integer multiple of a value; and the byte alignment information is an adjustment amount of the storage address of the data, illustratively, an order of magnitude of the value is megabytes (Mbyte, M), for example, 256 M, and the value is not limited in this embodiment;

h) namespace information, that is, an address range of the namespace, for example, a start address and a length of the namespace; and i) logical block address (LBA) information included in the namespace, where the LBA information includes an LBA identifier and an LBA address range, the LBA address range is, for example, a start address and a length of the LBA, and one namespace includes at least one LBA.

The foregoing describes the region and the namespace. In an illustrative embodiment, that the logic controller partitions the at least two persistent memories includes: the logic controller sends a query instruction to the persistent memory, where the query instruction is used to obtain memory information of the persistent memory; and the persistent memory sends the memory information to the logic controller according to the query instruction. Then, the logic controller sends a configuration instruction to the persistent memory based on the memory information, where the configuration instruction is used by the persistent memory to configure the region and the namespace, and the persistent memory configures the region and the namespace according to the configuration instruction. Certainly, in addition to the region and the namespace, the configuration instruction may be further used to instruct the persistent memory to configure the region label and the namespace label.

Illustratively, the memory information includes but is not limited to memory capacity information and LSA information. The memory capacity information includes information of being configured but not in use (e.g., and being used later) and a used capacity, and the LSA information includes information about the region label and the namespace label. The processor obtains the memory capacity information according to a query instruction “get partition information”, and obtains the LSA information according to a query instruction “get LSA”. The configuration instruction includes: “set partition information”, used to instruct the persistent memory to configure the region and the namespace. The configuration instruction further includes: “set LSA”, used to instruct the persistent memory to configure the region label and the namespace label. In addition, the processor can further obtain a total capacity of the persistent memory according to an instruction “identify memory device command”.

In a case where the logic controller partitions the persistent memory, that the processor accesses, based on the data processing request, a target persistent memory that is in at least two persistent memories and in communication with the processor includes: the processor accesses, based on the data processing request, at least one of the region or the namespace included in the target persistent memory that is in the at least two persistent memories and in communication with the processor. Illustratively, in this case, in addition to the processing identifier and the address, the data processing instruction sent by the processor further includes at least one of the region UUID and the namespace identifier described above. The region UUID is used to indicate a region in which the persistent data is located in the persistent memory, and the namespace identifier is used to indicate a namespace in which the persistent data is located in the persistent memory. Illustratively, in a case where the processor accesses the region, the data processing instruction includes the region UUID. In a case where the processor accesses the namespace, the data processing instruction includes only the namespace identifier, or includes both the namespace identifier and the region UUID. After the region or the namespace is determined, a relative position of the persistent data in the region or the namespace is determined based on the address, and successively indexing is performed based on the relative position to reach the persistent data. In the case where the processor includes the memory controller, a process of indexing to reach the persistent data may be performed by the memory controller. The following describes a process of indexing to reach the persistent data by using an example in which the namespace in the persistent memory is accessed, and the data processing instruction includes only the namespace identifier.

The region information of the region label includes a namespace identifier of each namespace in the region. Therefore, by querying the region information based on the namespace identifier included in the data processing instruction, the region in which the namespace indicated by the namespace identifier is located can be determined. In addition, the namespace information of the namespace label includes the address range of the namespace, for example, the start address and the length of the namespace. Therefore, the relative position of the persistent data in the namespace indicated by the namespace label can be determined based on the namespace information and the address. Illustratively, the relative position is an offset (e.g., position) of a start address of the persistent data relative to the start address of the namespace. Therefore, indexing is first performed to reach the region in which the namespace is located, indexing is performed in the region to reach the namespace, and then indexing is performed based on the relative position of the persistent data in the namespace to reach the persistent data.

In addition, a data processing apparatus in this embodiment includes at least two persistent memories, so that a RAID mechanism can be implemented based on the at least two persistent memories, thereby improving reliability of the computer device. In an illustrative embodiment, in a case where the processor includes the logic controller and the logic controller stores RAID information, that the processor accesses, based on the data processing request, a target persistent memory that is in at least two persistent memories and in communication with the processor includes: the processor accesses, based on the data processing request and the RAID information stored in the logic controller, the target persistent memory that is in the at least two persistent memories and in communication with the processor.

The RAID mechanism defines a data stripe, and one data stripe includes at least two data blocks. The RAID mechanism includes but is not limited to a plurality of levels such as RAID 0 to RAID 6. The levels included in the RAID mechanism are not limited in this embodiment, and any RAID level is selected based on an actual requirement. Illustratively, the RAID information stored in the logic controller includes but is not limited to levels and protocol stacks of RAID. For example, in RAID 0, the data blocks included in the data stripe are distributed into the at least two persistent memories for storage, and one persistent memory is configured to store at least one data block. For example, one data stripe includes eight data blocks A0 to A7, and there are two persistent memories. In this case, one persistent memory stores the data blocks A0 to A3, and the other persistent memory stores the data blocks A4 to A7. For another example, in RAID 1, the data blocks included in the data stripe are respectively stored in the at least two persistent memories, so that the at least two persistent memories are mirrored. The following describes RAID 5.

In an illustrative embodiment, there are at least three persistent memories, verification data is stored in a first persistent memory among the at least three persistent memories, and data blocks are stored in a second persistent memory among the at least three persistent memories. That the processor accesses, based on the RAID information stored in the logic controller, the target persistent memory that is in the at least two persistent memories and in communication with the processor includes: in response to detecting a failure of a data block stored in a second target persistent memory, the processor obtains, based on the RAID information, the verification data stored in the first persistent memory and other data blocks; and the processor recovers, based on the verification data and the data blocks stored in another second persistent memory, the failed data block in the second target persistent memory. The other data blocks are the data blocks stored in the another second persistent memory other than the second target persistent memory.

The first persistent memory is any one of the at least three persistent memories, and the second persistent memory is a persistent memory other than the first persistent memory among the at least three persistent memories. A quantity of first persistent memories and a quantity of second persistent memories are not limited in this embodiment. Illustratively, the second persistent memory is a persistent memory in which the address in the data processing request is located. That is, when the processor accesses a persistent memory based on the data processing request, in response to detecting the failure of a data block in the persistent memory, the method in the foregoing description may be performed to recover the failed data block in the persistent memory.

Illustratively, the persistent memory is configured to perform persistent storage on at least one data stripe, and one data stripe corresponds to verification data. The verification data and the data blocks are separately stored in different persistent memories persistently. When the second persistent memory that stores the data block is damaged, the data block stored in the second persistent memory is failed. Therefore, the processor obtains the verification data from the first persistent memory, and obtains another data block, other than the failed data block, in the data stripe from the another second persistent memory, so that the failed data block can be recovered based on the verification data and the another data block. The foregoing describes a case in which the persistent memory stores one data stripe. A case in which the persistent memory stores at least two data stripes is the same as that in the foregoing description. In some implementations, when the persistent memory stores at least two data stripes, verification data corresponding to the at least two data stripes are respectively located in different persistent memories.

In conclusion, in the embodiments of this application, the communication state between the persistent memory and the processor is controlled by the management chip, so that the processor is in communication with the at least two persistent memories. The processor can access the at least two persistent memories in communication with the processor, and the persistent memory can be configured to perform persistent storage on the data. Therefore, a storage capacity used for persistent storage of the data is expanded, and an insufficient storage capacity case is avoided. In addition, a new manner for persistent data storage is provided, which is different from a manner in which persistent storage is performed on the data by using only a disk in a related technology.

An embodiment of this application provides a computer system. The computer system includes at least two computer devices. The computer device is the computer device corresponding to any one of the accompanying drawings FIG. 1 to FIG. 10. The at least two computer devices are connected to each other, to form a memory pool between different computer devices, thereby improving stability and flexibility of the system.

A first computer device in the at least two computer devices is configured to send data to a second computer device, the second computer device is configured to store the received data in a persistent memory of the second computer device, the first computer device is any one of the at least two computer devices, and the second computer device is at least one computer device other than the first computer device in the at least two computer devices. The second computer device writes the received data in the persistent memory of the second computer device. For a writing process, refer to the description in the foregoing method embodiment. Illustratively, the first computer device sends the data to the second computer device by a high-speed network. A manner of transmitting the data between the first computer device and the second computer device is not limited in this embodiment.

In an illustrative embodiment, the data is data stored in a persistent memory of the first computer device. The first computer device reads the data from the persistent memory of the first computer device. For a reading process, refer to the description in the foregoing method embodiment.

It should be understood that the foregoing processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or may be any conventional processor or the like. It should be noted that the processor may be a processor supporting an advanced reduced instruction set computer machine (advanced RISC machine, ARM) architecture.

All or some of the foregoing embodiments may be implemented by software, hardware, firmware, or any combination thereof. When software is used for implementation, all or some of the embodiments may be implemented in a form of a computer program product. The computer program product includes one or more computer instructions. When computer program instructions are loaded and executed on a computer, the procedures or functions described in this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, microwave, or the like) manner. The computer-readable storage medium may be any available medium that can be accessed by the computer, or a data storage device, for example, a server or a data center that includes one or more available media. The available medium may be a magnetic medium (for example, a floppy disk, a hard disk, or a tape), an optical medium (for example, a digital versatile disc (DVD)), a semiconductor medium (for example, a solid state disk (SSD)), or the like.

The foregoing are merely embodiments of this application, and are not intended to limit this application. Any modification, equivalent replacement, improvement, and the like made within the spirit and principle of this application shall fall within the protection scope of this application.

What is claimed is:

1. A computer device, comprising:

a central processing unit (CPU) including a logic controller;

at least one management chip having an enabled state and a disabled state; and at least two persistent memories operatively coupled to the CPU by the at least one management chip, wherein the at least two persistent memories do not require an input/output (IO) interface operation for accessing the at least two persistent memories, each of the at least two persistent memories is configured to perform persistent storage on data, the at least one management chip is configured to independently control a communication state between each persistent memory and the CPU, the logic controller is configured to control the at least one management chip to control the communication state between each persistent memory and the CPU via the at least one management chip;

in response to the at least one management chip between one of the at least two persistent memories and the CPU being in the enabled state, the persistent memory is in communication with the CPU, in response to any management chip between one of the at least two persistent memories and the CPU being in the disabled state, the persistent memory is not in communication with the CPU, and the CPU is configured to access any one of the at least two persistent memories in communication with the CPU.

2. The device according to claim 1, further comprising:

a memory controller, wherein the at least two persistent memories are operatively coupled to the memory controller, the memory controller is operatively coupled to the CPU by the at least one management chip, the CPU is configured to access the memory controller based on a logical address, and the memory controller is configured to translate the logical address into a physical address, and access, based on the physical address, any one of the at least two persistent memories in communication with the CPU.

3. The device according to claim 1, wherein the logic controller is configured to store redundant array of independent disks (RAID) information, and the CPU is configured to access, based on the RAID information stored in the logic controller, any one of the at least two persistent memories in communication with the CPU.

4. The device according to claim 1, wherein the logic controller is configured to partition the at least two persistent memories to obtain regions and namespaces, and the CPU is configured to access at least one of the regions or the namespaces included in any one of the at least two persistent memories in communication with the CPU.

5. The device according to claim 1, further comprising:

at least two management chips, wherein the at least two management chips are separately coupled to the CPU, and any one of the at least two persistent memories is coupled to the CPU by any one of the at least two management chips.

6. The device according to claim 1, further comprising:

at least two management chips including first and second management chips, the first management chip is coupled to the CPU, the second management chip is coupled to the first management chip, and any one of the at least two persistent memories is coupled to the CPU by the first management chip or the second management chip.

7. The device according to claim 1, further comprising:

a volatile memory operatively coupled to the CPU, wherein the CPU is further configured to access the volatile memory.

8. A data processing method applied to a computer device having a central processing unit (CPU) including a logic controller, at least one management chip having an enabled state and a disabled state, and at least two persistent memories, wherein the at least two persistent memories are operatively coupled to the CPU by the at least one management chip, the at least two persistent memories do not require an input/output (IO) interface operation for accessing the at least two persistent memories, a communication state between each of the at least two persistent memories and the CPU is independently controlled by the at least one management chip, and each persistent memory is configured to perform persistent storage on data, the method comprising:

receiving, by the CPU, a data processing request;

controlling, by the logic controller, the at least one management chip to control the communication state between each persistent memory and the CPU via the at least one management chip;

accessing, by the CPU and based on the data processing request, a target persistent memory in the at least two persistent memories and in communication with the CPU; and reading data from the target persistent memory or writing data to the target persistent memory, wherein in response to the at least one management chip between one of the at least two persistent memories and the CPU being in the enabled state, the persistent memory is in communication with the CPU, and in response to any management chip between one of the at least two persistent memories and the CPU being in the disabled state, the persistent memory is not in communication with the CPU.

9. The method according to claim 8, wherein the device further comprises a memory controller, the at least two persistent memories are coupled to the memory controller, the memory controller is coupled to the CPU by the at least one management chip, and accessing the target persistent memory in the at least two persistent memories and in communication with the CPU comprises:

accessing, by the CPU, the memory controller based on the data processing request and a logical address;

translating, by the memory controller, the logical address into a physical address; and accessing, by the memory controller, the target persistent memory based on the physical address.

10. The method according to claim 8, wherein the logic controller stores redundant array of independent disks (RAID) information, and accessing the target persistent memory in the at least two persistent memories and in communication with the CPU comprises:

accessing, by the CPU and based on the data processing request and the RAID information stored in the logic controller, the target persistent memory in the at least two persistent memories and in communication with the CPU.

11. The method according to claim 8, wherein the method further comprises:

partitioning, by the logic controller, the at least two persistent memories to obtain regions and namespaces, wherein accessing the target persistent memory in the at least two persistent memories and in communication with the CPU comprises:

accessing, by the CPU and based on the data processing request, at least one of the regions or the namespaces included in the target persistent memory in the at least two persistent memories and in communication with the CPU.

12. The method according to claim 8, wherein the device further comprises a volatile memory coupled to the CPU, and the method further comprises:

accessing, by the CPU, the volatile memory based on the data processing request; and reading data from the volatile memory or writing data to the volatile memory.

13. A computer system, comprising:

a first computer device, wherein the first computer device comprises;

a central processing unit (CPU) including a logic controller;

at least one management chip having an enabled state and a disabled state; and at least two persistent memories operatively coupled to the CPU by the at least one management chip, wherein the at least two persistent memories do not require an input/output (IO) interface operation for accessing the at least two persistent memories, each of the at least two persistent memories is configured to perform persistent storage on data, the at least one management chip is configured to independently control a communication state between each persistent memory and the CPU, the logic controller is configured to control the at least one management chip to control the communication state between each persistent memory and the CPU via the at least one management chip;

in response to the at least one management chip between one of the at least two persistent memories and the CPU being in the enabled state, the persistent memory is in communication with the CPU, in response to any management chip between one of the at least two persistent memories and the CPU being in the disabled state, the persistent memory is not in communication with the CPU, and the CPU is configured to access any one of the at least two persistent memories in communication with the CPU; and a second computer device, wherein the second computer device comprises:

a CPU including a logic controller;

at least one management chip having the enabled state and the disabled state; and at least two persistent memories operatively coupled to the CPU by the at least one management chip, wherein the at least two persistent memories do not require an IO interface operation for accessing the at least two persistent memories, each of the at least two persistent memories is configured to perform persistent storage on data, the at least one management chip is configured to independently control a communication state between each persistent memory and the CPU, the logic controller is configured to control the at least one management chip to control the communication state between each persistent memory and the CPU via the at least one management chip;

in response to the at least one management chip between one of the at least two persistent memories and the CPU being in the enabled state, the persistent memory is in communication with the CPU, in response to any management chip between one of the at least two persistent memories and the CPU being in the disabled state, the persistent memory is not in communication with the CPU, and the CPU is configured to access any one of the at least two persistent memories in communication with the CPU, wherein the first computer device is configured to send data to the second computer device, and the second computer device is configured to store the data, received from the first computer device, in a persistent memory of the second computer device.

14. The system according to claim 13, wherein the data, sent to the second computer device, is stored in a persistent memory of the first computer device.

15. The system according to claim 13, wherein the first computer device further comprises:

a memory controller, wherein the at least two persistent memories are operatively coupled to the memory controller, the memory controller is operatively coupled to the CPU by the at least one management chip, the CPU is configured to access the memory controller based on a logical address, and the memory controller is configured to translate the logical address into a physical address, and access, based on the physical address, any one of the at least two persistent memories in communication with the CPU.

16. The system according to claim 13, wherein the logic controller is configured to store redundant array of independent disks (RAID) information, and the CPU is configured to access, based on the RAID information stored in the logic controller, any one of the at least two persistent memories in communication with the CPU.

17. The device according to claim 2, wherein the CPU interacts with the memory controller by using a compute express link (CXL) technology.

18. The device according to claim 2, wherein each of the at least two persistent memories comprises a label storage area (LSA) and data, the LSA comprises a region label and a namespace label, and the memory controller indexes the data based on LSA information.

19. The device according to claim 1, wherein the at least two persistent memories are memories for which a track search operation or a sector search operation do not need to be performed.

20. The method according to claim 8, wherein the at least two persistent memories are memories for which a track search operation or a sector search operation do not need to be performed.

* * * * *